United States Patent
Wu et al.

(10) Patent No.: US 9,460,516 B2
(45) Date of Patent: Oct. 4, 2016

(54) METHOD AND IMAGE PROCESSING APPARATUS FOR GENERATING A DEPTH MAP

(71) Applicants: NATIONAL TAIWAN UNIVERSITY, Taipei (TW); LITE-ON TECHNOLOGY CORP., Taipei (TW)

(72) Inventors: Jiun-Huei Proty Wu, Taipei (TW); Ching-Feng Cheng, Taipei (TW)

(73) Assignees: National Taiwan University, Taipei (TW); Lite-On Technology Corp., Taipei (TW)

( * ) Notice: Subject to any disclaimer, the term of this patent is extended or adjusted under 35 U.S.C. 154(b) by 0 days.

(21) Appl. No.: 14/792,748

(22) Filed: Jul. 7, 2015

(65) Prior Publication Data

US 2016/0110872 A1 Apr. 21, 2016

(30) Foreign Application Priority Data

Oct. 17, 2014 (TW) .............................. 103136010 A

(51) Int. Cl.
| | |
|---|---|
| *G06T 7/00* | (2006.01) |
| *G02B 3/00* | (2006.01) |
| *G06T 7/40* | (2006.01) |
| *H04N 5/222* | (2006.01) |
| *H04N 9/27* | (2006.01) |

(52) U.S. Cl.
CPC .......... *G06T 7/0051* (2013.01); *G02B 3/0006* (2013.01); *G06T 7/004* (2013.01); *G06T 7/0022* (2013.01); *G06T 7/0061* (2013.01); *G06T 7/40* (2013.01); *H04N 5/2226* (2013.01); *H04N 9/27* (2013.01); *G06T 2207/10028* (2013.01); *G06T 2207/10052* (2013.01)

(58) Field of Classification Search
CPC ... G06T 7/0051; G06T 7/0061; G06T 7/004; G06T 7/0022; G06T 7/40; G06T 2207/10028; G06T 2207/10052; G02B 3/0006; H04N 5/2226; H04N 9/27; H04N 2013/0081; H04N 13/0271
See application file for complete search history.

(56) References Cited

U.S. PATENT DOCUMENTS

| | | | | |
|---|---|---|---|---|
| 5,076,687 A * | 12/1991 | Adelson | ................... | G01C 3/08 250/201.7 |
| 7,620,309 B2 * | 11/2009 | Georgiev | ........... | H04N 5/23212 348/340 |
| 7,949,252 B1 * | 5/2011 | Georgiev | ........... | H04N 13/0228 396/334 |
| 8,111,320 B2 * | 2/2012 | Drazic | ............... | G02B 27/0075 348/222.1 |
| 8,427,548 B2 * | 4/2013 | Lim | ................... | H04N 5/23212 348/222.1 |
| 2012/0105590 A1 * | 5/2012 | Fukumoto | .......... | H04N 5/23216 348/46 |
| 2014/0375994 A1 * | 12/2014 | Yamanaka | .............. | G01J 3/513 356/402 |
| 2015/0085163 A1 * | 3/2015 | Aimi | .................. | H04N 5/23219 348/234 |

* cited by examiner

*Primary Examiner* — Manav Seth
(74) *Attorney, Agent, or Firm* — Rosenberg, Klein & Lee

(57) ABSTRACT

In a method for generating a depth map for an image, an image processing apparatus is configured to: determine a depth level for each of at least two objects in the image according to an angle of incidence in which light incident upon the object is projected onto an image sensor of a light-field camera; calculate a depth value of the depth level associated with one of the objects; estimate a depth value for the depth level associated with another one of the objects; and generate a depth map according to the depth values. The depth value is estimated based on a distance between first and second locations on the image sensor, on which light incident upon the reference and relative objects are projected.

12 Claims, 5 Drawing Sheets

METHOD AND IMAGE PROCESSING APPARATUS FOR GENERATING A DEPTH MAP

CROSS-REFERENCE TO RELATED APPLICATION

This application claims priority of Taiwanese Application No. 103136010, filed on Oct. 17, 2014.

FIELD

The disclosure relates to a method and an image processing apparatus for generating a depth map of an image, and more particularly to a method and an image processing apparatus for generating a depth map of an image with improved efficiency.

BACKGROUND

In image processing, a depth map of an image is presented as a grayscale image containing information related to a depth value of each pixel of the image, the depth value representing a distance between the camera and a part of an object shown in the image represented by the corresponding pixel. Conventionally, obtaining the depth map of the image involves weighted calculation of the depth value of each pixel of the image, which may be time-consuming. Moreover, when a video that includes a plurality of image frames is to be processed, in order to maintain efficiency, a processor with better calculating performance must be employed (resulting in higher hardware costs), or the number of the image frames of the video that are to be processed may need to be reduced (adversely affecting the quality of subsequently generated 3D images).

In addition, for refocusing an image captured by a light-field camera with the focus being on a certain part of the image, the depth map of the image will be used to obtain the depth values of the pixels composing that part of the image, and remaining parts of the image that are not to be focused will be blurred in various degrees.

SUMMARY

Therefore, an object of the disclosure is to provide a method that can alleviate at least one of the drawbacks of the prior arts.

According to the disclosure, the method is for generating a depth map for an image captured by a light-field camera. The image includes at least two objects. The light-field camera includes a main lens, an image sensor, and a microlens array that includes a plurality of microlenses. The method is implemented by an image processing apparatus and includes the following steps of: a) for each of the objects in the image, determining a depth level according to an angle of incidence in which light incident upon the object is projected onto the image sensor through the microlens array; b) calculating a depth value of the depth level associated with one of the objects that serves as a reference object, the depth value indicating the distance between the reference object and the main lens; c) estimating a depth value for the depth level associated with another one of the objects that serve as a relative object; and d) generating a depth map according to the depth values. In step c), the depth value is estimated based on a distance between a first location on the image sensor, on which light incident upon the reference object is projected, and a second location on the image sensor, on which light incident upon the relative object is projected.

Another object of the disclosure is to provide an image processing apparatus that is capable of implementing the above-mentioned method. According to the disclosure, the image processing apparatus is for generating a depth map for an image captured by a light-field camera. The image includes at least two objects. The light-field camera includes a main lens, an image sensor, and a microlens array that includes a plurality of microlenses. The image processing apparatus includes an object determining module, a depth value calculating module and a depth value estimating module. The object determining module is configured to determine a depth level for each of the objects in the image, according to an angle of incidence in which the object is projected onto the image sensor through the microlens array. The depth value calculating module is configured to calculate a depth value of the depth level associated with one of the objects that serves as a reference object, the depth value indicating the distance between the reference object and the main lens. The depth value estimating module is configured to estimate a depth value for the depth level associated with another one of the objects that serve as a relative object, and to generate a depth map according to the depth values. The depth value estimating module estimates the depth value based on a distance between a first location on the image sensor, on which light incident upon the reference object is projected, and a second location on the image sensor, on which light incident upon the relative object is projected.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
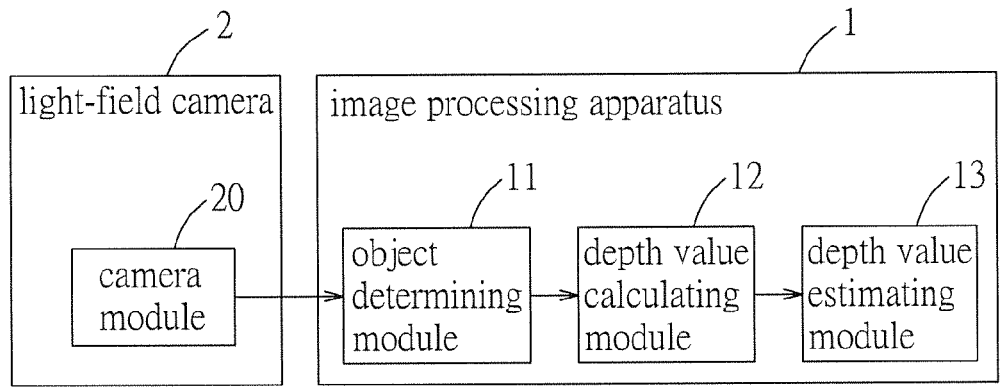
FIG. 1 is a block diagram illustrating an embodiment of an image processing apparatus according to the disclosure.
Figure 3:
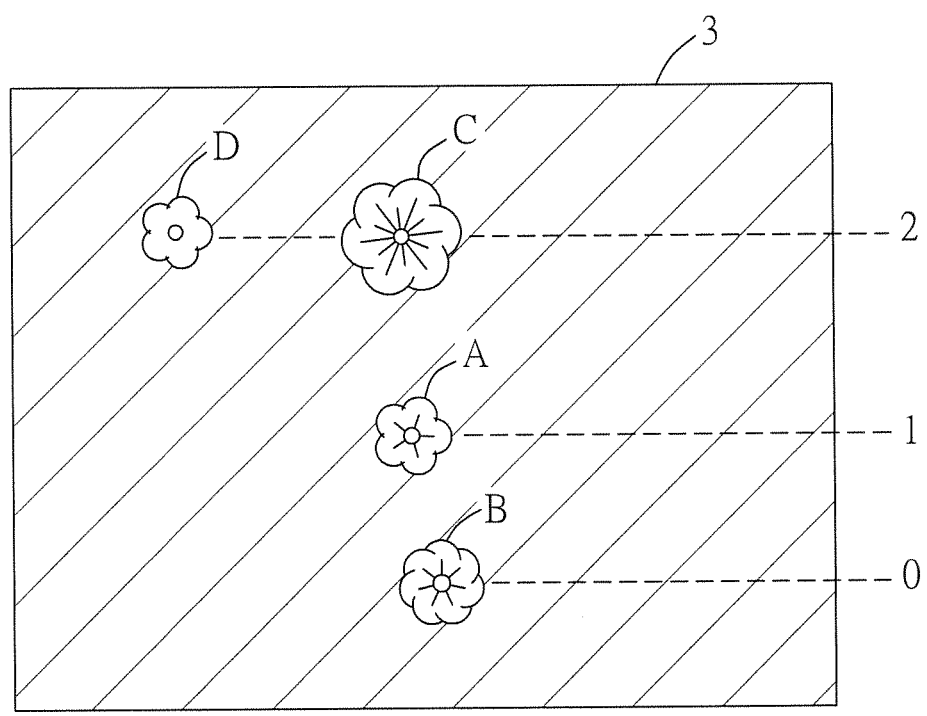
FIG. 3 illustrates an image captured by a light-field camera.
Figure 4:
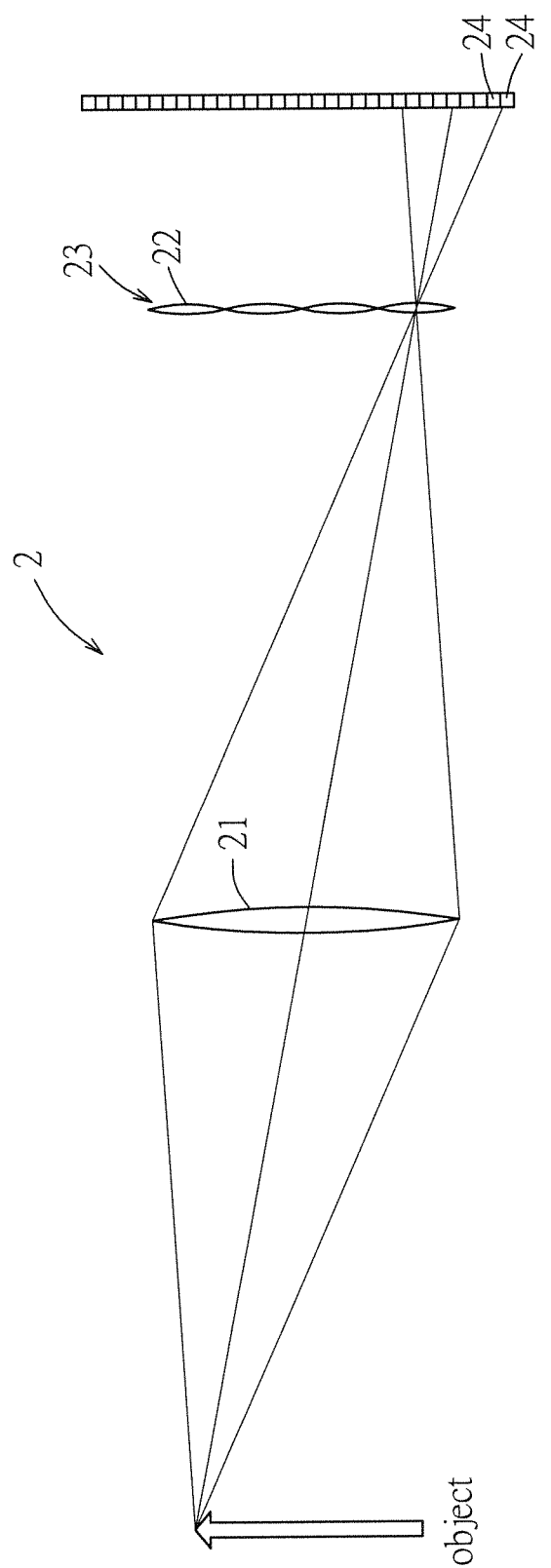
FIG. 4 illustrates components of the light-field camera.

Referring to FIG. 1, the embodiment of an image processing apparatus 1 according to the disclosure is configured to cooperate with a light-field camera 2. In practice, the image processing apparatus 1 may be integrated with the light-field camera 2, or may be implemented in a stand-alone apparatus (e.g., a computer) that is coupled to the light-field camera 2. The light-field camera 2 is capable of capturing an image 3 and outputting the image 3, and the image processing apparatus 1 is capable of processing the image 3 (see FIG. 3). Referring to FIG. 4, the light-field camera 2 includes a camera module 20. The camera module 20 includes a main lens 21, a microlens array 23 that includes a plurality of microlenses 22, and an image sensor 24. The microlens array 23 is disposed between the main lens 21 and the image sensor 24, the image sensor 24 includes a plurality of image sensing components, and light passing through the microlens array 23 from the main lens 21 is projected onto a position on the image sensor 24 (e.g., some of the image sensing components).

Referring back to FIG. 1, the image processing apparatus 1 includes an object determining module 11, a depth value calculating module 12 and a depth value estimating module 13. These modules 11, 12 and 13 are in an image processor (not depicted in the drawings) and may be implemented using software/firmware instructions that are executed by the image processor.

Figure 2:
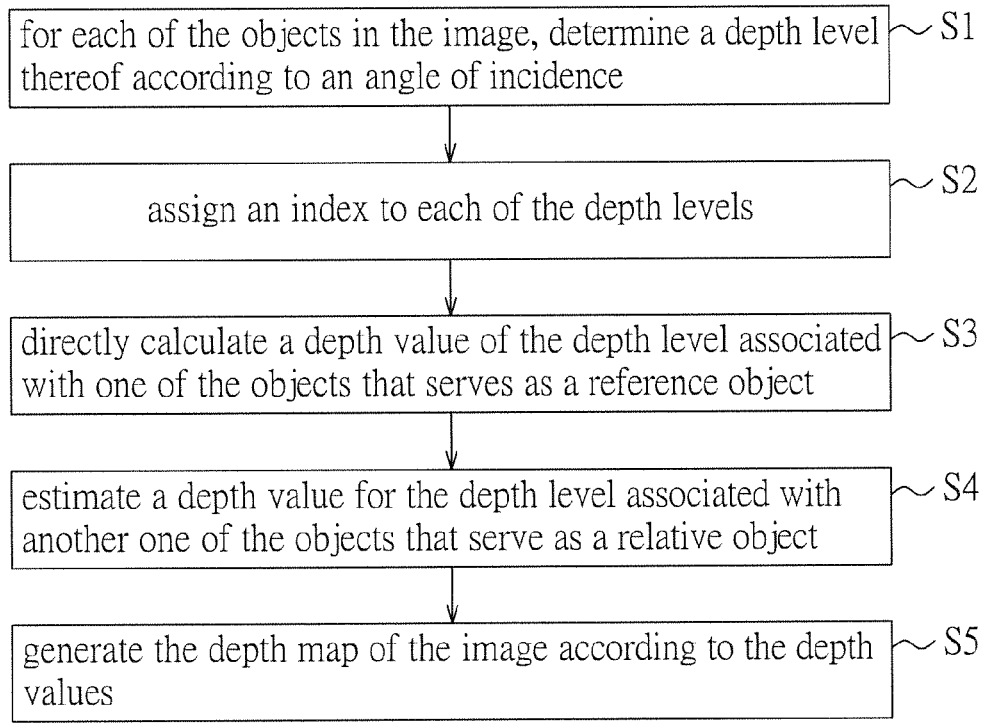
FIG. 2 is a flow chart illustrating an embodiment of a method for generating a depth map of an image according to the disclosure.

Further referring to FIG. 2, the image processing apparatus 1 is configured to implement a method for generating a depth map 4 (see FIG. 6) for the image 3 (see FIG. 3) captured by the light-field camera 2.

Figure 5:
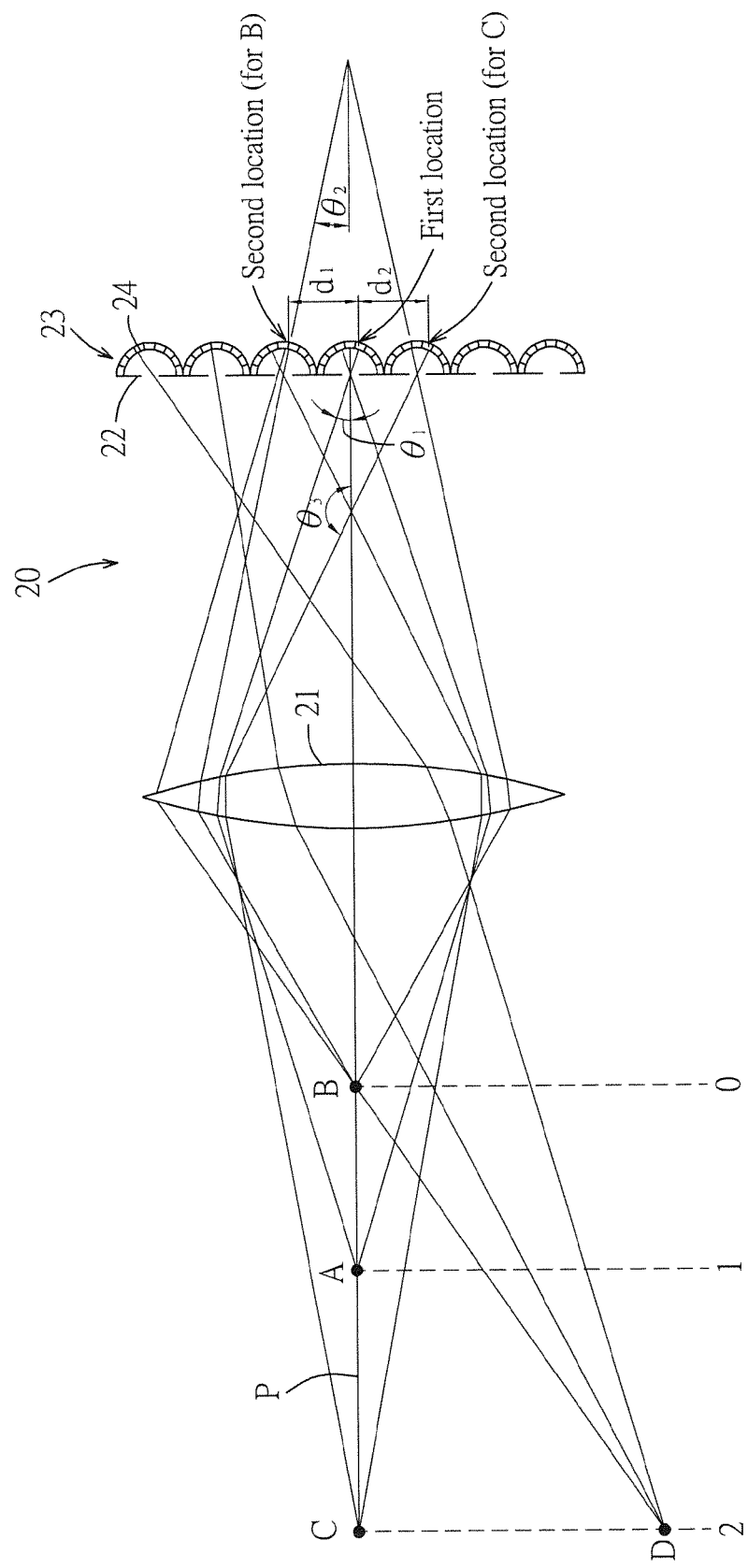
FIG. 5 illustrates light incident upon different objects in various locations of the image being projected onto various location of an image sensor behind a microlens array of the light-field camera through a main lens of the light-field camera.

In step S1, the object determining module 11 determines a number of objects included in the image 3 by analyzing the values of the pixels of the image 3. For example, the image 3 includes four objects (labeled as (A), (B), (C) and (D) in FIG. 3). For each of the objects (A), (B), (C) and (D) in the image 3, the object determining module 11 further determines a depth level associated therewith, according to an angle of incidence in which the light incident upon the object is projected onto the image sensor 24 through the microlens array 23 (see FIG. 5). For illustrative purposes, the image sensor 24 in FIG. 5 is arranged in a manner different from that of FIG. 4, in order to more clearly illustrate the different angles of incidence. It is noted that, in practice, the arrangement of the image sensor 24 is in the manner as shown in FIG. 4. The depth level specifies a value of a distance of the object (A), (B), (C) or (D) from the main lens 21. The angle of incidence may be determined by calculating a number of the image sensing components on which the light incident upon the object is projected. In this manner, the object determining module 11 is capable of determining that each of the objects (A), (B) and (C) belongs to a different depth level, owing to the angles of incidence associated with the objects (A), (B) and (C) being different from one another. On the other hand, the objects (C) and (D) are deemed to belong in the same depth level (but are horizontally spaced apart from each other) owing to the angles of incidence associated with the objects (C) and (D) being substantially identical (see FIG. 6, which illustrates different angles of incidence associated with each of the objects in FIG. 5, with respect to an optical axis (P) of the main lens 21). As a result, the object determining module 11 determines that the objects (A), (B), (C) and (D) in the image 3 may be classified into three distinct depth levels.

In step S2, the object determining module 11 assigns an index to each of the depth levels. In this embodiment, a value of the assigned index is positively related to the distance from the object classified in the depth level to the main lens 21 (i.e., the farther the distance from the object to the main lens 21, the larger the value of the assigned index). For example, the depth level to which the object (B) belongs may be assigned an index "0", the depth level to which the object (A) belongs may be assigned an index "1", and the depth level to which the objects (C) and (D) belong may be assigned an index "2". In other embodiment, the value of the assigned index may be negatively related to the distance from the object to the main lens 21. When the image 3 is subjected to further processing, the objects in the same depth level are considered to have an identical depth value (representing the distance from the object to the main lens 21).

In step S3, the depth value calculating module 12 directly calculates a depth value of the depth level associated with one of the objects that serves as a reference object. In this embodiment, the object (A) is selected to be the reference object. Specifically, the depth value $V_1$ of the depth level associated with the reference object (A) may be calculated based on a focal length of the main lens 21, a size of the image sensor 24, a distance between the microlens array 23 and the image sensor 24, and a focal length of the microlens array 23. The calculated depth value $V_1$ is the accurate distance between the reference object (A) and the main lens 21.

Figure 6:
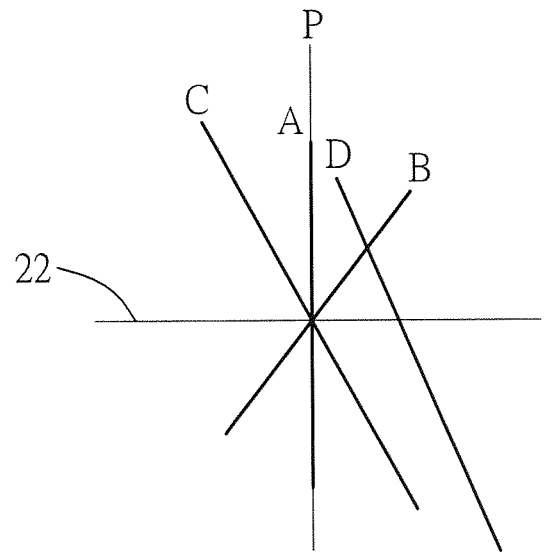
FIG. 6 illustrates different angles of incidence associated with each of the objects in FIG. 5, with respect to an optical axis of the main lens.
Figure 7:
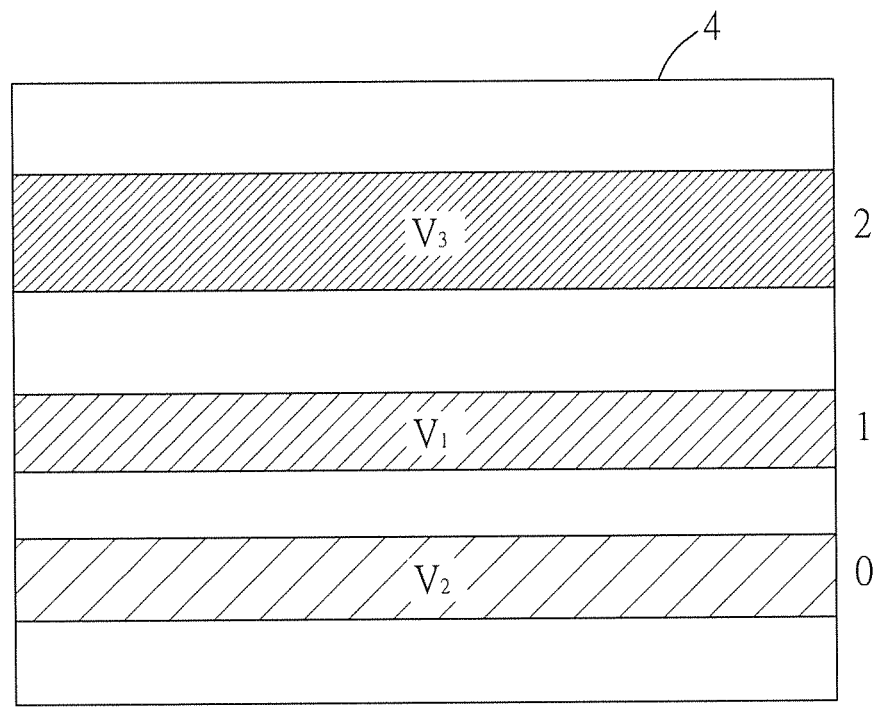
FIG. 7 illustrates a depth map generated according to the embodiment.

In step S4, the depth value estimating module 13 estimates a depth value for the depth level associated with another one of the objects (B), (C) and (D) that serve as a relative object. Specifically referring to FIG. 5, for the depth level with the index "0", the depth value $V_2$ is estimated based on a distance (labeled as $d_1$) between a first location on the image sensor 24, on which light incident upon the reference object (A) is projected, and a second location on the image sensor 24, on which light incident upon the relative object (B) is projected. Similarly, for the depth level with the index "2", the depth value thereof $V_3$ is estimated based on a distance (labeled as $d_2$) between the first location on the image sensor 24 and a different second location on the image sensor 24 on which light incident upon the relative object (C/D) is projected. Afterward, in step S5, the depth value estimating module 13 generates the depth map 4 (see FIG. 7) of the image 3 according to the depth values. Referring to FIG. 6, the generated depth map 4 may employ a specific grayscale value and/or a specific graphic to represent a corresponding depth level (i.e., the distance between each of objects in the image 3 and the main lens 21).

In this particular embodiment, the depth value estimating module 13 estimates the depth value by the following manner. As shown in FIG. 5, the objects (A), (B) and (C) are located on the optical axis (P) of the main lens 21. Due to the characteristics of the main lens 21, it can be derived that an included angle between the optical axis (P) and a light path along which light incident upon an object is projected onto the image sensor 24 through the microlens array 23 is equal to a first corresponding angle when a distance between the object and the main lens is equal to a first calculated distance, the included angle is equal to a second corresponding angle when the distance is equal to a second calculated distance, and the included angle is equal to a third corresponding angle when the distance is equal to a third calculated distance. In this embodiment, the first corresponding angle equals 0 degree when the first calculated distance is 10 meters, the second corresponding angle equals 45 degrees when the second calculated distance is 5 meters, and the third corresponding angle is 135 degrees when the third calculated distance is 15 meters. Taking the above information as a criterion, the depth value estimating module 13 first determines a first included angle between the optical axis (P) of the main lens 21 and a first light path along which light incident upon the reference object (A) is projected onto the image sensor 24 through the microlens array 23. For example, a 0-degree included angle indicates that the corresponding object is disposed 10 meters away from the main lens 21. It is assumed that the focused part of the image 3 is the projection of the reference object (A), and therefore the depth value and the included angle $\theta_1$ associated with the reference object (A) can be first computed. Afterward, the depth value estimating module 13 estimates a second included angle between the optical axis (P) of the main lens 21 and a second light path along which light incident upon each of the relative objects (B) and (C) is projected onto the image sensor 24 through the microlens array 23. Specifically, the second included angle is estimated based on the distance between the first location and the corresponding second location on the image sensor 24. Taking the relative object (B) as an example, using the distance $d_1$ between the first location and the second location, on which light incident upon the relative object (B) is projected, a second included angle $\theta_2$ may be estimated to be 35 degrees. The depth value estimating module 13 is then capable of estimating the depth value $V_2$ of the corresponding depth level (with the index 0) by using interpolation from the derived depth values and a difference of the first included angle $\theta_1$ and the second included angle $\theta_2$.

Similarly, for the relative object (C), using the distance $d_2$ between the first location and the second location, on which light incident upon the relative object (C) is projected, a second included angle $\theta_3$ may be estimated to be 120 degrees. The depth value estimating module 13 is then capable of estimating the depth value $V_3$ of the corresponding depth level (with the index 2) by using interpolation from the derived depth values and a difference of the first included angle $\theta_1$ and the second included angle $\theta_3$.

To sum up, the method of the disclosure generates the depth map 4 of the image 3 by directly calculating only one depth value of the depth level associated with the reference object (A) in the image 3, and subsequently estimating depth levels of each relative object in the image 3 based on the derived depth value and the distance between the first location and the corresponding second location on the image sensor 24. Comparing to the conventional way for generating a depth map, which involves directly calculating a depth value of each of the pixels of the image 3, the method of the disclosure is capable of generating the depth map 4 with an improved efficiency. Moreover, the index assigned to each of the depth levels may be used by the light-field camera 2 to obtain the depth value of an object belonging to the depth level, for refocusing the image 3 with the focus being on the object in the corresponding one of the depth levels.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for generating a depth map for an image captured by a light-field camera, the image including at least two objects, the light-field camera including a main lens, an image sensor, and a microlens array that includes a plurality of microlenses, the method being implemented by an image processing apparatus and comprising the steps of:
    a) for each of the objects in the image, determining a depth level according to an angle of incidence in which light incident upon the object is projected onto the image sensor through the microlens array;
    b) calculating a depth value of the depth level associated with one of the objects that serves as a reference object, the depth value indicating the distance between the reference object and the main lens;
    c) estimating a depth value for the depth level associated with another one of the objects that serves as a relative object; and
    d) generating a depth map according to the depth values;
    wherein, in step c), the depth value is estimated based on a distance between a first location on the image sensor, on which light incident upon the reference object is projected, and a second location on the image sensor, on which light incident upon the relative object is projected.

2. The method of claim 1, wherein, in step b), the depth value is calculated based on a focal length of the main lens, a size of the image sensor, a distance between the microlens array and the image sensor, and a focal length of the microlens array.

3. The method of claim 1, wherein step c) includes the sub-steps of:
    determining a first included angle between an optical axis of the main lens and a first light path along which light incident upon the reference object is projected onto the image sensor through the microlens array;
    estimating a second included angle between the optical axis of the main lens and a second light path along which light incident upon the relative object is projected onto the image sensor through the microlens array; and
    estimating the depth value by using interpolation from the depth value calculated in step b) and a difference of the first included angle and the second included angle.

4. The method of claim 3, wherein, in the sub-step of determining a first included angle, the first included angle is determined with reference to the following criterion:
    an included angle between the optical axis and a light path along which light incident upon an object is projected onto the image sensor through the microlens array is equal to a first corresponding angle when a distance between the object and the main lens is equal to a first calculated distance, the included angle is equal to a second corresponding angle when the distance is equal to a second calculated distance, and the included angle is equal to a third corresponding angle when the distance is equal to a third calculated distance.

5. The method of claim 3, wherein the second included angle is estimated based on the distance between the first location and the second location on the image sensor.

6. The method of claim 1, further comprising the step of assigning an index to each of the depth levels, the index being used by the light-field camera to obtain the depth value of an object belonging to the depth level with the index for performing refocusing of the image with the focus being on the object in the depth level.

7. An image processing apparatus for generating a depth map for an image captured by a light-field camera, the image including at least two objects, the light-field camera including a main lens, an image sensor, and a microlens array that includes a plurality of microlenses, said image processing apparatus comprising:
    an object determining module configured to determine a depth level for each of the objects in the image according to an angle of incidence in which light incident upon the object is projected onto the image sensor through the microlens array;
    a depth value calculating module configured to calculate a depth value of the depth level associated with one of the objects that serves as a reference object, the depth value indicating the distance between the reference object and the main lens; and a depth value estimating module configured to estimate a depth value for the depth level associated with another one of the objects that serve as a relative object, and to generate a depth map according to the depth values;

wherein said depth value estimating module estimates the depth value based on a distance between a first location on the image sensor, on which light incident upon the reference object is projected, and a second location on the image sensor, on which light incident upon the relative object is projected.

8. The image processing apparatus of claim 7, wherein said depth value calculating module calculates the depth value based on a focal length of the main lens, a size of the image sensor, a distance between the microlens array and the image sensor, and a focal length of the microlens array.

9. The image processing apparatus of claim 7, wherein said depth value estimating module estimates the depth value by:

determining a first included angle between an optical axis of the main lens and a first light path along which light incident upon the reference object is projected onto the image sensor through the microlens array;

estimating a second included angle between the optical axis of the main lens and a second light path along which light incident upon the relative object is projected onto the image sensor through the microlens array; and estimating the depth value by using interpolation from the depth value calculated by said depth value calculating module and a difference of the first included angle and the second included angle.

10. The image processing apparatus of claim 9, wherein, said depth value estimating module determines a first included angle with reference to the following criterion:

an included angle between the optical axis and a light path along which light incident upon an object is projected onto the image sensor through the microlens array is equal to a first corresponding angle when a distance between the object and the main lens is equal to a first calculated distance, the included angle is equal to a second corresponding angle when the distance is equal to a second calculated distance, and the included angle is equal to a third corresponding angle when the distance is equal to a third calculated distance.

11. The image processing apparatus of claim 9, wherein the second included angle is estimated by said depth value estimating module based on the distance between the first location and the second location on the image sensor.

12. The image processing apparatus of claim 7, wherein said object determining module is further configured to assign an index to each of the depth levels, the index being used by the light-field camera to obtain the depth value of an object belonging to the depth level with the index for performing refocus of the image with the focus being on the object in the depth level.

* * * * *